US011699037B2

(12) United States Patent
Rankin

(10) Patent No.: US 11,699,037 B2
(45) Date of Patent: Jul. 11, 2023

(54) SYSTEMS AND METHODS FOR MORPHEME REFLECTIVE ENGAGEMENT RESPONSE FOR REVISION AND TRANSMISSION OF A RECORDING TO A TARGET INDIVIDUAL

(71) Applicant: John Rankin, Williamsport, OH (US)

(72) Inventor: John Rankin, Williamsport, OH (US)

(73) Assignee: Rankin Labs, LLC, Williamsport, OH (US)

( * ) Notice: Subject to any disclaimer, the term of this patent is extended or adjusted under 35 U.S.C. 154(b) by 98 days.

(21) Appl. No.: 17/194,711

(22) Filed: Mar. 8, 2021

(65) Prior Publication Data

US 2021/0286944 A1    Sep. 16, 2021

Related U.S. Application Data

(60) Provisional application No. 62/986,850, filed on Mar. 9, 2020.

(51) Int. Cl.
*G06F 40/268* (2020.01)
*G10L 21/013* (2013.01)
*G10L 13/00* (2006.01)
*G10L 15/26* (2006.01)

(52) U.S. Cl.
CPC ............ *G06F 40/268* (2020.01); *G10L 15/26* (2013.01)

(58) Field of Classification Search
CPC .............................. G10L 21/013; G10L 13/00
USPC ............................................ 84/622; 704/260
See application file for complete search history.

(56) References Cited

U.S. PATENT DOCUMENTS

| | | |
|---|---|---|
| 3,688,090 A | 8/1972 | Rankin |
| 5,040,218 A | 8/1991 | Vitale et al. |
| 6,023,724 A | 2/2000 | Bhatia et al. |
| 6,140,568 A | 10/2000 | Kohler |
| 6,532,445 B1 | 3/2003 | Toguri et al. |
| 6,567,416 B1 | 5/2003 | Chuah |
| 6,584,442 B1 | 6/2003 | Suzuki et al. |
| 6,714,985 B1 | 3/2004 | Malagrino et al. |
| 6,751,592 B1 | 6/2004 | Shiga |
| 6,757,248 B1 | 6/2004 | Li et al. |

(Continued)

FOREIGN PATENT DOCUMENTS

GB     2487795 A     8/2012

OTHER PUBLICATIONS

Berkling, K et al., Improving Accent Identification Through Knowledge of English Syllable Structure, 5th International Conference on Spoken Language Processing, 1998.

(Continued)

*Primary Examiner* — Farzad Kazeminezhad
(74) *Attorney, Agent, or Firm* — Standley Law Group LLP; Jeffrey S. Standley; Adam J. Smith

(57) ABSTRACT

Systems and methods for increasing the impact of a message for a target individual are provided. An audio recording of the message and audio recordings of the target individual are each associated with transcribed text, which is separated into morphemes. Morphemes in the message are substituted with, or supplemented by, matching morphemes in the audio recordings of the target individual to create a revised version of the audio recording of the message, and then electronically transmit the revised audio recording to an electronic device associated with the target individual.

19 Claims, 2 Drawing Sheets

(56) References Cited

U.S. PATENT DOCUMENTS

| | | |
|---|---|---|
| 7,103,025 B1 | 9/2006 | Choski |
| 7,310,604 B1 | 12/2007 | Cascone et al. |
| 8,374,091 B2 | 2/2013 | Chiang |
| 8,397,151 B2 | 3/2013 | Salgado et al. |
| 9,350,663 B2 | 5/2016 | Rankin |
| 9,691,410 B2 | 6/2017 | Yamamoto et al. |
| 2001/0017844 A1 | 8/2001 | Mangin |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2003/0028380 A1* | 2/2003 | Freeland ............. G10L 13/00 704/260 |
| 2003/0031198 A1 | 2/2003 | Currivan et al. |
| 2004/0128140 A1 | 7/2004 | Deisher |
| 2005/0105712 A1 | 5/2005 | Williams et al. |
| 2005/0131692 A1 | 6/2005 | Charles |
| 2005/0154580 A1 | 7/2005 | Horowitz et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0251264 A1 | 11/2006 | Higashihara et al. |
| 2007/0094008 A1 | 4/2007 | Huang et al. |
| 2007/0223395 A1 | 9/2007 | Lee et al. |
| 2007/0282594 A1 | 12/2007 | Spina |
| 2008/0162115 A1 | 7/2008 | Fuji et al. |
| 2008/0177543 A1 | 7/2008 | Nagano et al. |
| 2010/0103830 A1 | 4/2010 | Salgado et al. |
| 2011/0149891 A1 | 6/2011 | Ramakrishna |
| 2011/0191372 A1 | 8/2011 | Kaushansky et al. |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0019738 A1* | 1/2013 | Haupt ............. G10L 21/013 84/622 |
| 2013/0028121 A1 | 1/2013 | Rajapakse et al. |
| 2013/0058231 A1 | 3/2013 | Paddon et al. |
| 2013/0189652 A1 | 7/2013 | Martila |
| 2014/0012584 A1 | 1/2014 | Mitsui et al. |
| 2014/0073930 A1 | 3/2014 | Sethi et al. |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0160333 A1 | 6/2015 | Kim et al. |
| 2015/0161096 A1 | 6/2015 | Kim |
| 2015/0161144 A1 | 6/2015 | Goto et al. |
| 2015/0229714 A1 | 8/2015 | Venkatsubra et al. |
| 2015/0331665 A1 | 11/2015 | Ishii et al. |
| 2015/0379834 A1 | 12/2015 | Datta et al. |
| 2016/0269294 A1 | 9/2016 | Rankin |
| 2017/0090872 A1 | 3/2017 | Mathew et al. |
| 2017/0162186 A1 | 6/2017 | Tamura et al. |
| 2017/0277679 A1 | 9/2017 | Miyabe et al. |
| 2017/0345412 A1 | 11/2017 | Mitsui et al. |
| 2018/0012511 A1 | 1/2018 | Reed et al. |
| 2018/0018147 A1 | 1/2018 | Sugawara |
| 2018/0024990 A1 | 1/2018 | Okura et al. |
| 2018/0075351 A1 | 3/2018 | Iwakura |
| 2018/0102975 A1 | 4/2018 | Rankin |
| 2018/0279010 A1 | 9/2018 | Watanabe et al. |
| 2018/0288211 A1 | 10/2018 | Kim |
| 2019/0035431 A1 | 1/2019 | Attorre et al. |
| 2019/0259073 A1 | 8/2019 | Enokizono et al. |
| 2019/0295528 A1 | 9/2019 | Rankin |
| 2020/0020351 A1 | 1/2020 | Rankin |
| 2020/0065369 A1 | 2/2020 | Cha et al. |

OTHER PUBLICATIONS

Veaux, C. et al., The Voice Bank Corpus: Design, Collection and Data Analysis of a Large Regional Accent Speech Database, 2013 International Conference Oriental COCOSDA, pp. 1-4, 2013.

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Batchelder, E., Bootstrapping the Lexicon: A Computational Model of Infant Speech Segmentation, Cognition 83, 2002, pp. 167-206.

Cerisara, C., Automatic Discovery of Topics and Acoustic Morphemes from Speech, Computer Speech and Language, 2009, pp. 220-239.

Cole, P., Words and Morphemes as Units for Lexical Access, Journal of Memory and Language, 37, 1997, pp. 312-330.

Feist, J., Sound Symbolism in English, Journal of Pragmatics, 45, 2013, pp. 104-118.

Gerken, L. et al., Function Morphemes in Young Children's Speech Perception and Production, Developmental Psychology, 1990, vol. 26, No. 2, pp. 204-216.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Darwish, K. et al., Verifiably Effective Arabic Dialect Identification, Qatar Computing Research Institute, Qatar Foundation, Proceedings of the 2014 Conference on Empirical Methods in Natural Language Processing, pp. 1465-1468, Oct. 25-29, 2014.

Hamada, S. et al., Developing a Transfer-Based System for Arabic Dialects Translation, Intelligent Natural Language Processing: Trends and Applications, Studies in Computational Intelligence 740, 2018.

Sharma, M. et al., Learning Aided Mood And Dialect Recognition Using Telephonic Speech, 2016.

Zribi, I. et al., Morphological Disambiguation of Tunisian Dialect, Journal of King Saud University—Computer and Information Sciences, Jan. 29, 2017, pp. 147-155.

* cited by examiner

SYSTEMS AND METHODS FOR MORPHEME REFLECTIVE ENGAGEMENT RESPONSE FOR REVISION AND TRANSMISSION OF A RECORDING TO A TARGET INDIVIDUAL

CROSS-REFERENCE TO RELATED APPLICATIONS

This application claims the benefit of U.S. Provisional Application Ser. No. 62/986,850 filed Mar. 9, 2020, the disclosures of which are hereby incorporated by reference as if fully restated herein.

TECHNICAL FIELD

Exemplary embodiments relate generally to systems and methods for personalizing advertising by integrating a target's morpheme(s) to increase engagement.

BACKGROUND AND SUMMARY OF THE INVENTION

A morpheme is, essentially, the smallest unit of sound that provides a distinguishable difference in a language. The morphemes of native language not only form the sound patterns that we experience within the culture of the speaker but may also control the development of thought patterns. When first exposed to the morphemes of their natural environment, children begin to produce a perceptual concept of the environment that is as important to cognitive development as it is to the development of language skills.

Words in spoken language do not connect to our conscious mind as the symbols that we have come to know. It is difficult to determine how we connect to these symbols of sound and what they mean to who we are. As one commenter notes, "that sound symbolism in English has not been well understood by its detractors or by its proponents" ("*Sound Symbolism*" in *English*, Journal of Pragmatics, Feist, 2013, pg. 116). As an example, one may consider what begins with the infant and develops into the thinking adult. One might imagine an infant when first presented with the stimulus of the smell of baking bread. This infant has no perceptual understanding of what the smell means. However, as the infant is habituated with the presentment of bread smell equals delicious food, a stimulus response develops that is effectively perceptual learning. The infant begins to develop an understanding, or perception, of the world around them as they are presented with more and more stimuli that can be associated with each experience. These are effectively the development of cognitive patterns within the brain. Prior to the infant's understanding of the stimulus, they were merely an associated sensory input. But now, these stimuli become attached to an understanding and a complete perception; a pattern has emerged.

The hippocampus, within the temporal lobe, allows for the storing of information within the episodic and semantic memories. It is these specific types of memories or patterns that form the spatial working memory necessary to remember object orientation within the context of our perceptions. Without the hippocampus, the ability to remember different angles and approaches to objects would not be possible. As these patterns begin to form an understanding of our environment and our personality, they become, for lack of a better expression, our consciousness.

Infant Lexicon Development

A child is presented with a series of noises that represent the sound of the language in use around them. Perhaps the child hears something like "the man in the moon." For them, it is a disconnected series of noises, but for us it is a coherent sentence that conveys meaning. The infant begins a process of pattern matching, attempting to determine what elements of the sound have been heard that might produce a response. The first response from the child might be to pass back the sound: "them anin them oon." This gibberish is effectively nonsense to the adult listeners and does not elicit a response that generates a coherent pattern for the infant. Eventually the child produces a word, or a phrase that produces a consistent and repeatable response, and thus a pattern begins to develop. Through this process, the infant can build a working lexicon of words and sounds that carry meaning and thus, produce a response.

The linguistic units upon which children build their understanding of language are sound segments that we have come to label "morphemes." "Children are sensitive to the existence of function morphemes. This may allow them to segment utterances into phrasal units from the outset, without using content words as the sole starting points. In addition, young children are sensitive to the segmental detail of factors and this may allow them to differentially label the syntactic categories of the phrases they isolate." (*Function morphemes in young children's speech perception and production*, Developmental Psychology, Gerken, Landau, & Remez, 1990, p. 214). Therefore, the morphemes that are the fundamental building blocks of the infant lexicon must hold the key for the understanding of the development that grows from this point, because the knowledge of sound meaning is not present from birth and must be constructed from the noise of the world around us.

Structure within the Mind

There is a difference between word and sound of the distinct speakers, but is there an influence on their word choice, intellectual capacity, and language use because of the morphemes that helped develop their consciousness? There are "recognition models that assume that morphologically complex words are represented at some level of the processing system in a decomposed form" (*Words and morphemes as units for lexical access*, Journal of Memory and Language, Cole, Segui, & Taft, 1997, p. 3(2)). This is not outside the proposals of another commenter, Chomsky, where he proposes that a deep level structure of meaning is stored in some common format (*Topics in the theory of generative grammar*, The Hague: Mouton, Chomsky, 1978). However, for Chomsky, the deep structure is a universal understanding of concepts that can be known across social and geographic boundaries, while decomposed morphemes are specific to the culture and environment within which they have developed.

Now that we have established that there is a decomposed structure where morphemes develop our understanding of language, where is this located? It was Endel Tulving who first proposed a distinction between declarative and non-declarative memory. "He defined semantic memory as knowledge about words and concepts, their properties, and interrelations" (*Cognitive Psychology: Mind and Brain*, Smith and Kosslyn, 2007, p. 195). Memory is divided into two main sections: declarative and procedural. Declarative memory is subdivided into two further sections: episodic and semantic. Episodic memory deals with specific details of an event, by associating it with what, when, and where. It is this type of memory that holds our fond images of childhood and mother's home cooking. Semantic memory differentiates from episodic, because it does not relate to a special location or time; it is concepts that are contained within semantic memory. Procedural memory is developed from perceptual-motor learning. This is the place that holds learned behavior; it is where we remember how to ride a bike or come to dinner when a bell is rung. "This type of memory does not depend upon the structural integrity of the temporal lobe system" (*Understanding leukemias lymphomas and myelomas*, Mughal, Goldman, & Mughal, 2009).

Long-term memories are memories that persist over an extensive period of time and remain accessible by other cognitive processes but can reflect different categories of information. "Declarative memory is knowledge to which we have conscious access, such as motor and cognitive skills (procedural knowledge), perceptual priming, and simple learned behaviors that derive from conditioning, habituation, or sensitization" (*Cognitive Nueroscience: The Biology of the Mind*, Gazzaniga, Ivry, & Mangun, 2009, p. 321). Cognitive patterns that are related to morphemes must be stored within semantic memory, as this area of memory is specific to the developmental process and does not relate to events or places, nor does it align with learned behavior.

Acoustic morphemes from speech are stored within our semantic memory in a specific pattern, or network, that allows for connected access and retrieval. Christophe Cerisara's work in the area of morpheme and lexical study affirmatively demonstrated that not only is there a decomposed structure of morphemic data, but that that data is indeed structured into a hierarchy of topics that relate to meaning and knowledge (*Automatic discovery of topics and acoustic morphemes from speech*, Computer Speech and Language 23, Cerisara, 2009, pp. 220-239). The ability of a speaker to produce and develop sentences, is entirely related to their ability to construct complex thoughts out of the information that is stored within the semantic and episodic memory of the brain. By layering this information into memory patterns that comprise not only clocks of meaning but also meaning organized and retrievable by sound. This conceptual knowledge is the fundamental building materials for all forms of higher thinking within a functioning adult. As layers of information are constructed to produce sentences, these sentences will invariably be affected by the retrieval process of how the information is stored in the network. "Some of the models propose that concepts are represented by their semantic features or semantic properties. For example, the word dog has several semantic features, such as 'is animate,' 'has four legs,' and 'barks,' and they are assumed to be represented in the conceptual network" (*Cognitive neuroscience, the biology of the mind*, Gazzaniga, Ivry, & Mangun, 2009, p. 392). Since this network is ultimately acoustic as well as semantic, it is clear that morphemes play an invaluable role in the development and construction of language.

What is needed is a system and method that utilizes the specific internal lexicon of an individual in a way that drives primary psychological connections to encourage more effective engagements in attention and persuasion. As the internal morpheme lexicon is central to communication, it is also connected with the deep and early memories that form and develop personality. These early memories trigger strong feelings of connection and acceptance in a powerful and unconscious way.

When an individual hears sounds that match their morpheme lexicon, several instinctive and unconscious responses occur. These responses are evolutionary as the comfort response of an infant protects the infant from harm, as sounds within the lexicon match these of the infant's caregivers. This natural response can produce similar reactions within an adult individual, and engage the individual in ways that are effective and profound. By harvesting specific morphemes from individual speech patterns, it is possible to trigger a subconscious engagement response when these same morphemes are presented as external stimulus.

The disclosed systems and methods utilize the morpheme lexicon within an individual as a supply of sounds to be reflected back to the individual to stimulate an engagement response that can influence, persuade, or otherwise effect the individual's attitudes. This may be accomplished by harvesting natural morpheme sounds from a target individual and integrating them within at least part of a message. This creates a highly individualized and specialized message that can trigger internal psychological barriers and powerfully influence a stimulus response.

The disclosed systems and methods may personalize a message to be delivered to at least one target individual. An original audio recording of a message may be made. That recording may be provided with, or translated into, a text version of the message. The text may be segmented into morphemes. A speech sample from the target individual may be recorded, translated into text, and segmented into morphemes. The target individual's morphemes may be stored in one or more databases. The morphemes of the advertising message matching corresponding stored morphemes from the target individual may be swapped or supplemented into the original audio such that the original audio recording of the message comprises one or more portions of the target individual's sound sample. The modified message is presented to the target individual and may result in a more impactful response. In this way, while a common message in terms of textual content may be provided to a number of individuals, the message may be uniquely modified for each target to increase its impact.

One exemplary objective of the present disclosures is to produce influences, persuasions, and changes in attitudes that guide a targeted individual in a desired direction. This direction can be used for advertising, customer satisfaction, political influence, or any number of additional cognitive formations. In order to accomplish this objective, the morpheme lexicon of a targeted individual may be exploited as these fundamental building blocks of language and communication are, at the heart of the concepts, ideas, understandings, and foundation of the individual's personality.

Another exemplary objective of the present disclosures is to increase the value and influence an intended message to a targeted individual in an unconscious way that is highly personal. The disclosed systems and methods deliver messages that communicate with a targeted individual in an extremely personal way for more than mere demographic selection. While the use of demographics is known to improve the impact of the advertising messages, the present system and method provide the ability to individualize an advertising message to the exact individual audience intended, thus significantly improving the effectiveness of the advertising delivery.

Incorporation of the individual's morpheme may be accomplished, in exemplary embodiments, by collecting a sample of the target's speech. The sample may be converted into text, and the morphemes may be identified and separately stored. A message to be provided to the target may be converted into text, if not already in text form, and individual morphemes in the text may be identified. Matching morphemes between the sample speech and the message may be identified. The matching morphemes may be substituted into the message, or the message may be otherwise supplemented with the sample morphemes.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
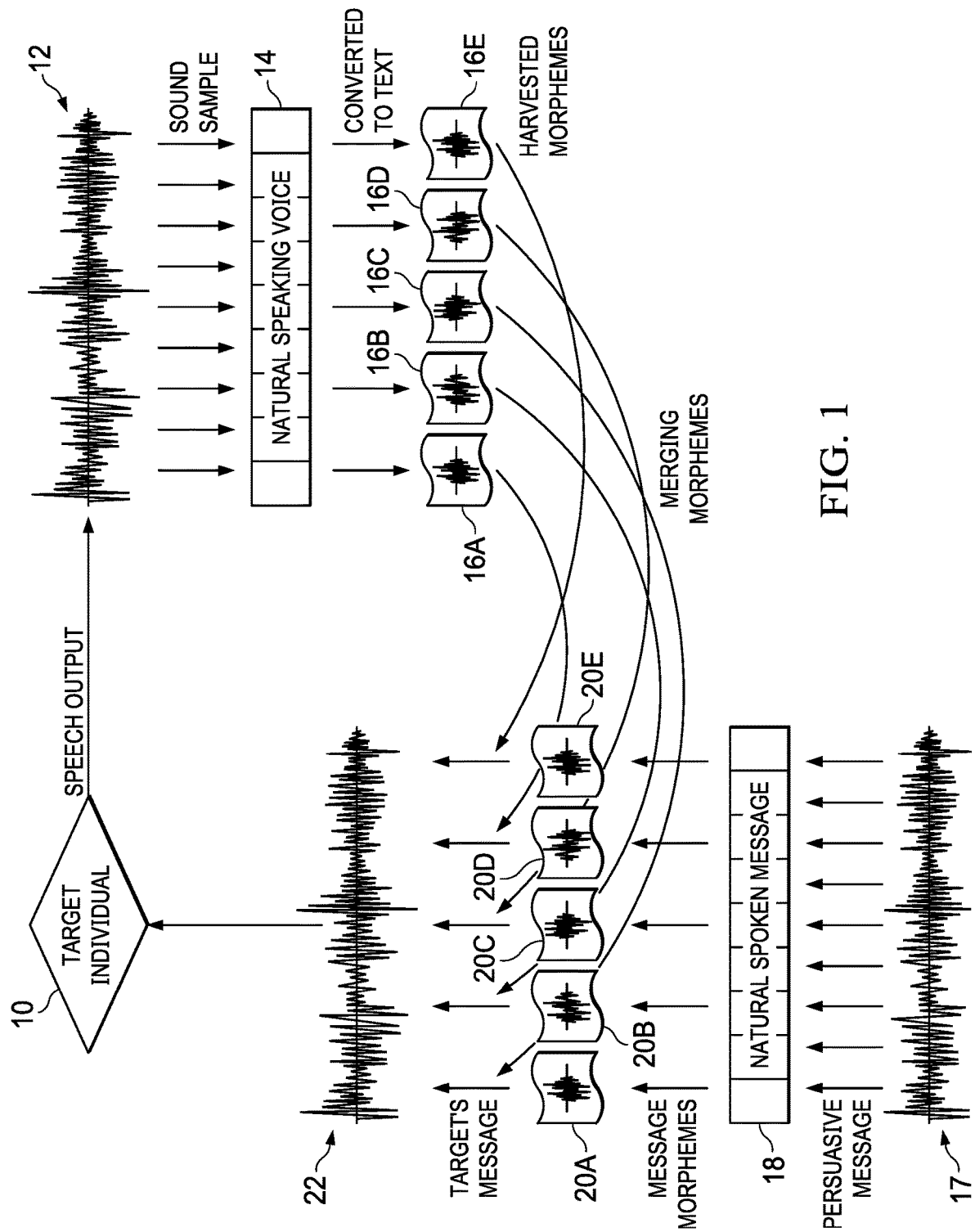
FIG. 1 is a simplified diagram illustrating the delivery of a unique message to a specific individual.
Figure 2:
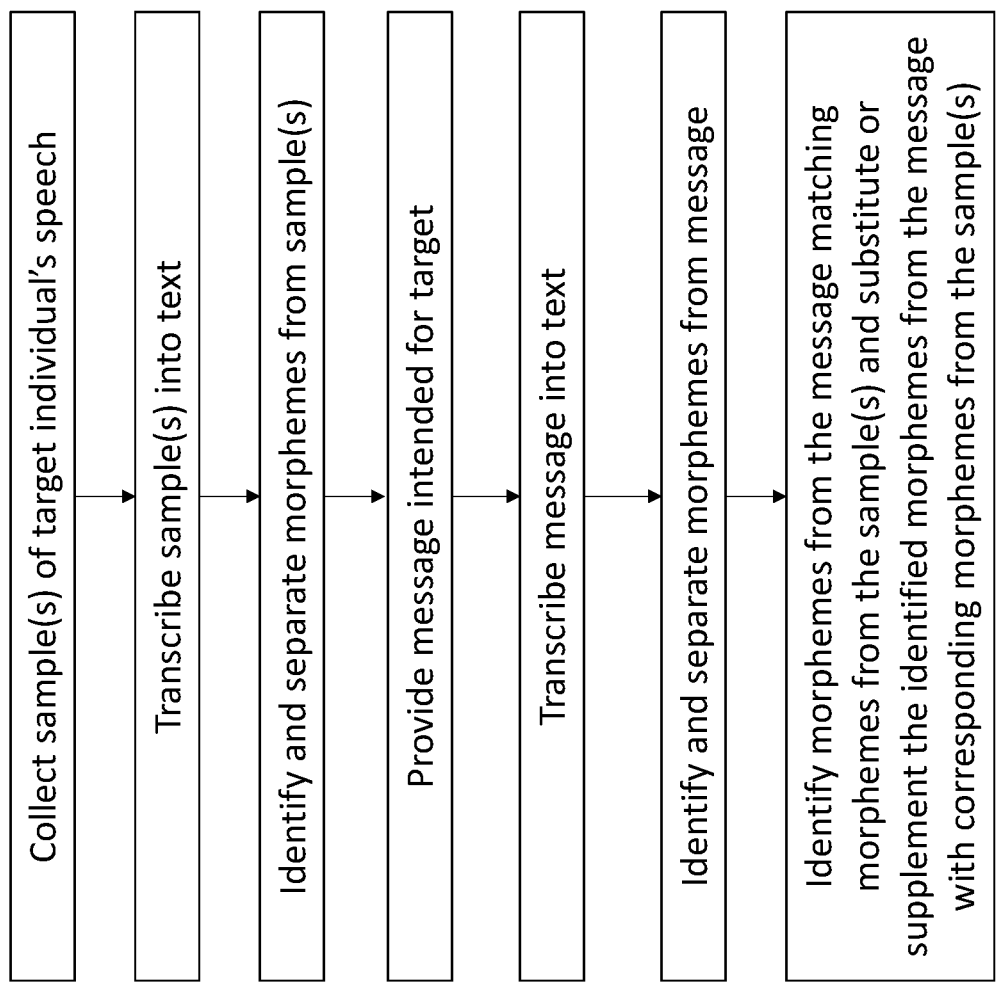
FIG. 2 is a flow chart with exemplary logic for delivery of the unique message to the specific individual.

FIG. 1 is a simplified diagram illustrating the delivery of a unique message to a specific individual and FIG. 2 is a flow chart with exemplary logic for delivery of the unique message to the specific individual. A target individual 10 may be selected for influence, persuasion, or attitude adjustment, to name a few examples without limitation. This individual 10 may be identified to receive a message 22. The message 22 may be uniquely intended for said individual 10, though such is not required. In other words, the messages 22 the individual 10 is set to receive may not be intended for sharing with, or otherwise duplicate transmission to, others as would be normal in a common environment, though such is not required. In exemplary embodiments, this may be accomplished through the morpheme substitution and/or supplementation techniques shown and/or described herein. In such cases, the text of the message 22 may be the same for multiple individuals, but the message 22 actually delivered may be altered for each individual based on the morpheme substitution and/or supplementation. In other exemplary embodiments, the text of the message 22 may be unique to the individual. The message 22 may be configured for electronic communication such as by way of one or more electronic devices such as, but not limited to, smart phones, computer tablets, personal computers, combinations thereof, and the like. The communication may be isolated so that the message 22 will be received only by the intended individual 10.

A sample 12 of the target individual's speech may be collected. This sound sample 12 may be digitally represented and/or translated into a digital format for processing, manipulation, analysis, combinations thereof, or the like. Examples of this sound collection effort may include, without limitation, capturing speech during phone usage, ambient collection using a microphone (such as but not limited to a microphone enabled smart device) in proximity to the target individual 10, verbal interaction between the target individual 10 and an organizational representative, solicited presentation of the individual's 10 speech, or any other technique that allows for the collection of the targeted individual's 10 speech, preferably in a digital format. However, other formats may be utilized for collection and known techniques for digitization may be utilized.

The captured sound sample 12 of the targeted individual's 10 speech may be converted into a digital text format or machine-readable version 14 of the words being spoken. This conversion may be accomplished in a way that preserves the connection between sound and words. For example, without limitation, the sentence "The Black Cat," may begin with a sound sample that is converted into the digital letters THE BLACK CAT, while the portions of the audio format may be connected with each letter of the digital text 14. In this way, the sound that makes up the "C" in cat is identifiable in the audio format from the speakers' 10 sound sample 12. Other languages or text formats may be utilized. The conversion may be accomplished using one or more speech-to-text software programs.

The speakers' 10 morphemes 16 may be harvested from the sound sample by extracting the sections of the sound sample 12 that represent each morpheme 16A-E presented in the digital text 14. For example, without limitation, the word "CAT" contains three distinct morphemes 16 that are the smallest unit of sound that makes a difference in a language, i.e., "C", "A", and "T". While, as another example without limitation, the word "THE" only contains two, "Th" and "E". All the morphemes 16 in the collected sound sample 12 may be harvested, separated, and labeled or otherwise associated with their corresponding language text 14. It is important to note that there is a significant difference between a morpheme and a phoneme, as a morpheme is a unit of sound while a phoneme is a unit of language, and only morphemes are stored within the lexicon of the human brain from infancy. To illustrate this difference, the word "CAT" has two phonemes, "C" and "AT", while it has three morphemes, "C", "A", and the sound "T".

In exemplary embodiments, the individual morphemes in the converted text 14 from the sample 12 may be automatically and electronically recognized, such as but not limited to, by way of one or more software programs configured to recognize morphemes in words based on one or more algorithms and/or information on morphemes stored in one or more databases.

One or more databases may be developed or provided with the target individual's 10 morphemes 16. In exemplary embodiments, systems and methods for collecting samples of the target individual's 10 speech sample 12, converting the sample 12 into text 14, identifying and separating morphemes 16, associating each morpheme 16 with the corresponding portion of text 14, building one or more databases comprising the same, and matching between sound fragments may include one or more components, elements, steps, techniques, combinations thereof, or the like as shown and/or described in US Pub. No. 2019/0295528 published Sep. 26, 2019 and/or US Pub. No. 2020/0020351 published Jan. 16, 2020, the disclosures of each of which are hereby incorporated by reference as if fully restated herein.

A message 22, such as but not limited to a persuasive message, may be selected for delivery to the target individual 10. The message 22 may additionally be intended for delivery to any number of additional targets 10. This message 22 may be, for example without limitation, an advertising message, a political message, a customer satisfaction message, or any other verbal form that is intended to influence, persuade, and otherwise capture the target individual's 10 attention. This message 22 may have a digital text format 18 connected to an original sound audio recording 17.

Where the message text 18 has one or more morphemes 20A-E in common with the morphemes 16A-E harvested from the target individual's 10 speech sample 12, the harvested morphemes 16A-E may be substituted or supplemented into the delivery message 22. For example, without limitation, the harvested morphemes 16A-E may be wholly substituted into the message recording 17. As another example, without limitation, the harvested morphemes 16A-E may be mixed with, added to, or otherwise incorporated in whole or in part into the message recording 17. In other words, the original sound recording 17 may be altered to include fragments 16A-E of the sound sample 12 from the target individual 10 to create the delivery message 22. These sound fragments 16A-E may replace or supplement morphemes 20A-E within the original sound recording 17 with the corresponding morphemes 16A-E harvested from the target 10. For example, without limitation, if the message text 18 includes the sentence "Come to the festival", the sounds that represent the "C" in the original recording 17 from the word "Come" is the same sound, or morpheme, harvested from the "C" in the "Cat" in the aforementioned example. In this example, the "C" in the original recording 17 may be substituted with, or otherwise incorporated into, the corresponding "C" morpheme 16 from the target individual's 10 speech sample 12. The remainder of the text 18 may be used with the original audio recording 17. In this way, the delivery message 22 may contain specific fragments of sound from the target individual 10 so that the message 22 mimics sounds learned in early childhood from the target individual's 10 caregivers, thus triggering an emotional reaction in the target individual 10.

In exemplary embodiments, the comparison between the message 22 and the target individual's 10 sound sample 12 may be made by comparing the text 18 of the message with the text 14 of the sample 12. However, other methods of comparison, such as but not limited to by audio analysis, may be utilized. Such comparison, substitution and/or supplementation may be accomplished by way of one or more software programs.

The message 22 may be presented to the target individual 10 with the morphemes 16 integrated to match the sounds harvested from the target 10 themselves. Since the supplanted morphemes 16 are contained within the morpheme lexicon of the individual 10, there will be several psychological unconscious triggers that occur, such as but not limited to: attraction for similar behavior and sound will result in a heightened desire or attention; comfort for familiar sounds that have been developed in infancy will encourage a disarming of message persuasion and delivery; and a strong sense of conformity will occur due to the principles of mimicking behavior and reflection of personal sounds. The difference may be subtle to the target individual 10 but may significantly influence the target individual 10, even if in an unconscious manner.

The disclosed systems and methods, in exemplary embodiments without limitation, may permit a common message in terms of textual content 18 to be provided to a number of targeted individuals 10. However, the message 22 ultimately delivered to one or more target individuals 10 may be uniquely modified with morphemes 16A-E of the target individual 10 to increase the impact of the messages 22. In exemplary embodiments, without limitation, the tracking and/or identification of target individuals 10 may be performed by advertising tracking and device use association, for example without limitation, by associating one or more personal electronic devices with users based on a variety of communications, user provided information, inferences, some combination thereof, or the like, which are known to those of skill in the art. The individualized messages 22 may be delivered to the target individual 10 though one or more personal electronic devices associated with the target individual 10 such as but not limited to, smart phones, televisions, computers, tablets, smart watches, e-readers, radio, automated calls, some combination thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may be personal computers, smartphones, tablets, databases, servers, or the like. The electronic connections and transmissions described herein may be accomplished by wired or wireless means.

What is claimed is:

1. A system for increasing the impact of a message for a target individual, said system comprising:
   one or more databases comprising one or more audio recordings of the target individual and an audio recording of a message intended for the target individual, wherein the audio recording of the message is spoken by another; and
   one or more electronic storage devices comprising software instructions, which when executed, configure one or more processors to:
   identify morphemes in the one or more audio recordings of the target individual;
   identify morphemes in the audio recording of the message intended for the target individual;
   determine whether any of the morphemes in the audio recordings of the message match any of the morphemes in the one or more audio recordings of the target individual;
   substitute or supplement portions of the audio recordings of the message containing the morphemes having a match in the one or more audio recordings of the target individual with corresponding portions of the one or more audio recordings of the target individual to generate a revised audio recording; and electronically transmit the revised audio recording to an electronic device associated with the target individual.

2. The system of claim 1 wherein:

said software instructions are configured to identify said morphemes in the one or more audio recordings of the target individual by:

converting each of the one or more audio recordings of the target individual into text; and separating the converted text into said morphemes; and said software instructions are configured to identify said morphemes in the audio recording of the message by:

converting the audio recording of the message intended for the target individual into text; and separating the converted text of the message intended for the target individual into said morphemes.

3. The system of claim 2 wherein:

said software instructions are configured to identify the morphemes in the audio recordings of the message present in the one or more audio recordings of the target individual by comparing each of the separate morphemes of the converted text of the audio recording of the message intended for the target individual with each of the separate morphemes of the converted text of the one or more audio recordings of the target individual to find matches.

4. The system of claim 1 wherein:

said software instructions are configured to supplement the portions of the audio recordings of the message containing the identified morphemes with the corresponding portions of the one or more audio recordings of the target individual by electronically mixing the portions of the audio recordings of the message containing the identified morphemes with the corresponding portions of the one or more audio recordings of the target individual.

5. The system of claim 1 wherein:

said software instructions are configured to substitute the portions of the audio recordings of the message containing the identified morphemes with the corresponding portions of the one or more audio recordings of the target individual by replacing the portions of the audio recordings of the message containing the identified morphemes with the corresponding portions of the one or more audio recordings of the target individual.

6. A method for increasing the impact of a message for a target individual, said method comprising the steps of:

transcribing an audio recording of the message for the target individual into text;

separating the transcribed text of the message into morphemes;

transcribing one or more audio recordings of the target individual into text;

separating the transcribed text for the one or more audio recordings of the target individual into morphemes;

identifying one or more morphemes of the transcribed text for the message matching the transcribed text for the one or more audio recordings of the target individual;

substituting or supplementing portions of the audio recording of the message corresponding to the identified morphemes with corresponding portions of the one or more audio recordings of the target individual to create a revised version of the audio recording of the message; and transmitting the revised version of the audio recording of the message to one or more electronic devices associated with the target individual.

7. The method of claim 6 wherein:

the step of electronically transcribing the audio recording of the message comprises use of a speech to text software program at one or more computing devices; and the step of electronically transcribing the one or more audio recordings of the target individual comprises use of said speech to text software program said one or more computing devices.

8. The method of claim 7 wherein:

said one or more audio recordings of the target individual are recorded at, and received from, the one or more electronic devices associated with the target individual by way of network and stored at said computing devices.

9. The method of claim 8 wherein:

said one or more electronic devices comprise at least one smartphone.

10. The method of claim 7 wherein:

the step of separating the transcribed text of the message into morphemes is performed automatically by software at said one or more computers; and the step of separating the transcribed text of the one or more audio recordings of the target individual into morphemes is performed automatically by said software at said one or more computers.

11. The method of claim 6 further comprising the steps of:

generating a database comprising the one or more audio recordings of the target individual and the transcribed and separated text associated with the one or more audio recordings of the target individual.

12. The method of claim 11 wherein:

said database comprises a number of additional audio recordings and transcribed and separated text associated with said number of additional audio recordings for a number of additional target individuals.

13. The method of claim 6 wherein:

the step of substituting or supplementing the portions of the audio recording of the message corresponding to the identified morphemes with the corresponding portions of the one or more audio recordings of the target individual to create the revised version of the audio recording of the message comprises the step of electronically mixing the portions of the audio recording of the message corresponding to the identified morphemes with the corresponding portions of the one or more audio recordings of the target individual.

14. The method of claim 6 wherein:

at least the steps of associating the one or more audio recordings of the target individual with the transcribed text of the one or more audio recordings of the target individual, separating the transcribed text for the one or more audio recordings of the target individual into morphemes, identifying the one or more morphemes of the transcribed text for the message matching the transcribed text for the one or more audio recordings of the target individual, and substituting or supplementing the portions of the audio recording of the message corresponding to the identified morphemes with the corresponding portions of the one or more audio recordings of the target individual to create the revised version of the audio recording of the message are performed electronically at one or more servers.

15. A method for utilizing an individual's morpheme lexicon to engage the individual's attention, or persuade the individual, by reflecting the individual back upon themselves, said method comprising the steps of:
    selecting a target individual for influence, attention, or persuasion;
    sampling the target individual's natural speech in an electronic audio format;
    converting the speech sample from the electronic audio format into a digital text format;
    dividing the electronic audio format of the speech sample into morphemes using a morpheme lexicon;
    providing a delivery message for the target individual in electronic audio format;
    substituting the morphemes from the speech sample for the target individual into the delivery message to develop a personalized message; and
    delivering the personalized message to the target individual.

16. The method of claim 15 wherein:
    the speech sample for the target individual is collected from a recorded conversation on an electronic phone or mobile device.

17. The method of claim 15 wherein:
    the speech sample for the target individual is collected from the sounds recorded by an electronic microphone of an adjacent mobile device, or computer; or
    the speech sample for the target individual is collected from the sounds recorded during an interaction or exchange with a party, or associate, with the delivery message system.

18. The method of claim 15 further comprising the steps of:
    storing and indexing the morphemes for the target individual at a database.

19. A system for increasing the impact of a message for a target individual, said system comprising:
    one or more databases comprising one or more audio recordings of the target individual and an audio recording of a message intended for the target individual;
    one or more electronic storage devices comprising software instructions, which when executed, configure one or more processors to:
        convert each of the one or more audio recordings of the target individual into text;
        separate the converted text into morphemes, wherein each of said morphemes of the converted text of the one or more audio recordings is associated with a corresponding portion of the one or more audio recordings;
        convert the audio recording of the message intended for the target individual into text;
        separating text of the message intended for the target individual into morphemes, wherein each of the morphemes of the text of the message intended for the target individual is associated with a corresponding portion of the audio recording of the message intended for the target individual;
        identify morphemes in the text of the message intended for the target individual which are also present in the text converted from the one or more audio recordings; and
        substitute or supplement portions of the audio recording of the message intended for the target individual associated with the identified morphemes with the portions of the one or more audio recordings of the target individual also associated with the identified morphemes to create a revised version of the audio recording of the message intended to the target individual comprising at least some of the one or more audio recordings of the target individual for distribution to the target individual.

\* \* \* \* \*